United States Patent [19]
Ettelt

[11] 3,966,598
[45] June 29, 1976

[54] CIRCULAR DISSOLVED GAS FLOTATION SYSTEM

[75] Inventor: Gregory A. Ettelt, Berwyn, Ill.

[73] Assignee: Tenco Hydro/Aerosciences, Inc., Countryside, Ill.

[22] Filed: Feb. 24, 1975

[21] Appl. No.: 552,650

[52] U.S. Cl.............................. 210/44; 210/104; 210/221 P
[51] Int. Cl.² ..................... B03D 1/02; B03D 1/26
[58] Field of Search ........................ 209/168–170; 210/44, 104, 109, 116, 199, 221, 519

[56] References Cited
UNITED STATES PATENTS

| | | | |
|---|---|---|---|
| 1,357,587 | 11/1920 | Peck | 210/44 |
| 3,121,680 | 2/1964 | Ciabattari | 210/109 X |
| 3,136,724 | 6/1964 | Lind et al. | 210/519 |
| 3,179,252 | 4/1965 | Vrablik | 210/44 X |
| 3,246,763 | 4/1966 | Baum | 210/221 P |
| 3,395,800 | 8/1968 | Kraus et al. | 210/519 X |
| 3,642,618 | 2/1972 | Silva | 210/44 |

Primary Examiner—Charles N. Hart
Assistant Examiner—Robert H. Spitzer
Attorney, Agent, or Firm—George H. Gerstman

[57] ABSTRACT

A circular dissolved gas flotation system is provided for increasing the loading rate with increasing size flotation basins. The dissolved gas flotation system includes a submerged annular release chamber located about the periphery of the flotation basin for peripherally introducing particle-carrying liquid and gas bubbles uniformly into the flotation basin. The release chamber defines a continuous slotted opening substantially about the length of the release chamber. The size of both the slotted opening and the cross-sectional area of the release chamber are reduced from the divider baffle to the splitter baffle to uniformly distribute the flow about the periphery of the flotation basin. The release chamber includes a divider baffle to split the input flow in opposite directions tangentially about the length of the release chamber, and a splitter baffle to prevent the two tangential flows from converging.

19 Claims, 6 Drawing Figures

CIRCULAR DISSOLVED GAS FLOTATION SYSTEM

BACKGROUND OF THE INVENTION

This invention relates to a liquid treatment system capable of removing particulate from a liquid mixture or to provide a concentrated volume of particulate using the dissolved gas flotation principle.

In engineering liquid treatment problems, many situations are encountered where the liquids are significant in volume and/or contain high amounts of particulates. Such particulates are insoluble solids, whether organic and/or inorganic, or insoluble organic liquids. Due to the high volume and nature of the particulates, on many occasions the liquids are not amenable to treatment by sedimentation because of the inability either to effect adequate removal or to provide sufficient concentration.

Prior art flotation equipment has been found unsatisfactory for increasing the loading rate with flotation basins of increased size. As used herein, the term "loading rate" means the overflow rate of input flow per surface area of the flotation basin. Manufacturers of flotation equipment have had to use lower loading rates with increasing size basins in order to maintain performance. Typical loading rates for basins less than a 200 square feet area are 2.0 to 3.0 gallons per minute per square foot. Loading rates can be less than 2.0 gallons per minute per square foot for basins approaching 500 square feet in surface area and even lower for larger basins.

Through operational experience it became evident to the inventor that design flotation basins are inlet-limiting with increasing size. Conventional flotation basins are circular or rectangular in perimeter structure. In the circular units, the size of the center inlet configuration is increased for greater flow inputs. In rectangular units, an additional number of inlet configurations are utilized. However, for either structure the inlet velocity still increases appreciably. Gas bubbles previously attached to the particles then become dislodged. Non-floating particles flow with the effluent, causing reduced effluent clarity, or fall to the basin bottom from loss of buoyancy, because the rise rate has been reduced below the overflow rate. No amount of basin capacity following the inlet will cause a significant percentage of these dislodged bubbles to reattach to the particles. In this respect, inlet conditions are irreversible in the dissolved gas flotation process as opposed to the sedimentation process where added diameter or length will offset inlet turbulence.

This creating of turbulence with greater flow in larger basins can also be theoretically illustrated with the Reynolds number. The Reynolds Number is a dimensionless term used in hydraulics to indicate turbulent flow. For liquid flow in conduits, the Reynolds number where turbulence begins is between 2000 to 4000. Reynolds Number for a flotation basin sized for 100 gpm input at a typical loading rate of 2.5 gpm/ft$^2$ (seven ft. diameter) with a conventional center fed inlet would be on the order of 1600. This is considered non-turbulent and is satisfactory. However, a conventional flotation basin sized for 1,000 gpm at the same loading rate (approximately 22 ft. in diameter) would have an inlet Reynolds Number on the order of 10,000 or well into turbulent range. A conventional rectangular unit (typically 10 ft. wide by 40 ft. long) with multiple inlets would have inlet Reynolds Number on order of 6,000 or also well into turbulent range. A flotation unit of the same size and for the same 1,000 gpm input, but made in accordance with the principles of my invention, however, would have an inlet Reynolds Number on the order of 1,500 which is still non-turbulent range and satisfactory.

It is an object of this invention to provide a dissolved gas flotation system capable of handling increased loading rates with increasing size flotation basins.

Another object of this invention is to enhance performance and increase efficiency of a dissolved gas flotation system.

A further object of this invention is to reduce the heat velocity of a flotation basin and to decrease the discharge velocity of the inlet relative to the entrance velocity of the inlet.

It is also an object of this invention to obtain a minimum inlet velocity into a flotation basin.

Another object of this invention is to reduce the amount of bubbles too large to attach to particulates, to reduce the amount of large bubbles that would cause turbulence upon entering the flotation basin, and to reduce the amount of large bubbles that would disrupt other bubble-attached particulates in the flotation basin.

A further object of this invention is to increase the average rise rate of the particulate-carrying bubbles and to optimize the separation force of the particulate-carrying bubbles. As used herein, the term "separation force" is defined as the ratio of particulate rise rate to flow velocity.

A further object of this invention is to minimize the expansion and growth of gas bubbles so that gas bubbles that are attached to particulates do not become dislodged.

It is another object of this invention to expand the size of small bubbles, which are less buoyant than large bubbles and have only limited ability for attaching to particulates, to an efficient productive size capable of attaching to particulates before being discharged into the flotation basin.

Another object of this invention is to decrease the center well structure size in conventional circular basins, thereby increasing the capacity available for floatable separation and accumulation.

Another object of this invention is to improve effluent clarity and increase the amount of concentrated floatables.

It is also an object of this invention to circumfuse the inlet flow uniformly about the periphery of the flotation basin.

Another object of this invention is to direct the discharge flow from the periphery of the flotation basin obliquely toward the center surface.

This and other objects will become apparent from the following description and appended claims.

BRIEF DESCRIPTION OF THE INVENTION

In accordance with the present invention, there is provided a dissolved gas flotation system for increasing loading rate with increased size flotation basins. In one embodiment of the invention, the system includes a flotation basis which receives a liquid having gaseous bubbles and particles. A submerged release chamber is located generally about a major portion of the inner periphery of the flotation basin to reduce the velocity of the liquid discharge for uniform distribution into the flotation basin. The release chamber includes an inlet to receive the liquid and an outlet to discharge the liquid into the flotation basin to permit upward flotation of the gaseous bubbles and particulates.

In the illustrative embodiment, the outlet defines a slotted opening substantially about the perimeter of the release chamber to increase the rise rate of the bubbles by minimizing the amount of the bubbles that become turbulent and do not adhere to particulates. The inlet also includes a divider baffle to split the input flow in opposite directions tangentially about the length of the release chamber. The outlet includes a splitter baffle to insure the two tangential flows from converging. The divider baffle and splitter baffle together also prevents establishing a single direction flow pattern to avoid circumvolution of flotation basin contents.

In the illustrative embodiment, the system includes a flotation basin and pressure pump operatively associated therewith for pumping recycled water. An ejector is provided for introducing gas into the liquid, and a solubiliation device is provided for dissolving the gas in the liquid.

A pressure-reducing valve is provided for forming gas bubbles and combining means is provided for combining particulate-carrying liquid with the gas bubbles. Means are provided for directing the combined particulate-carrying liquid and gas bubbles into the flotation basin to permit particulate-carrying gas bubbles to float to the surface of the liquid within the flotation basin.

A more detailed explanation of the invention is provided in the following description and claims and is illustrated in the accompanying drawings.

DESCRIPTION OF THE ILLUSTRATIVE EMBODIMENT

Figure 1:
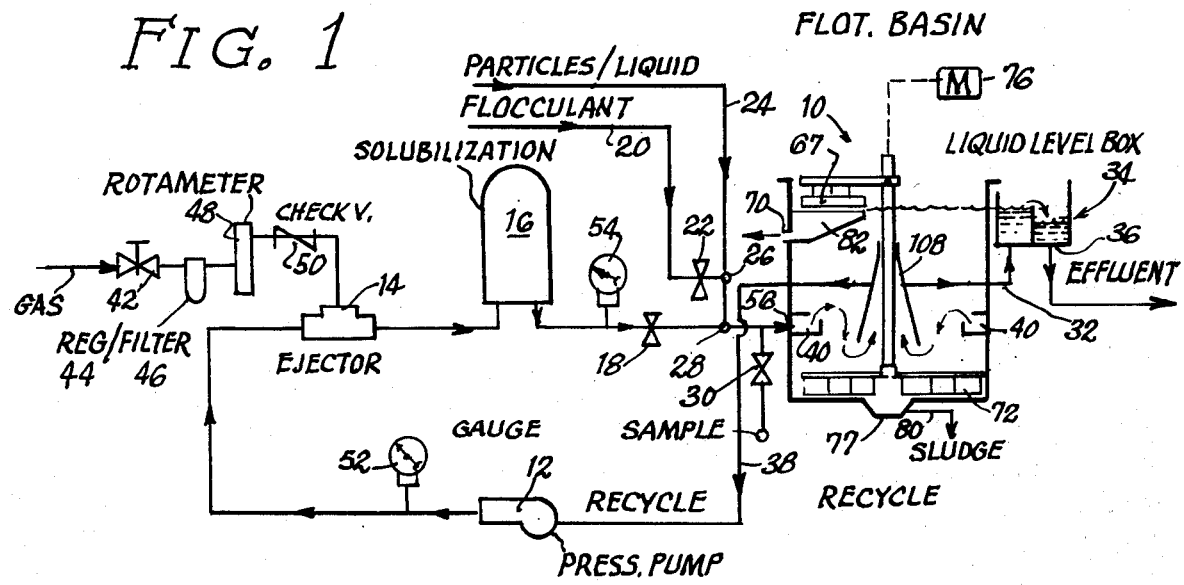
FIG. 1 is a schematic diagram of a dissolved gas flotation system in accordance with the principles of the present invention.

Referrring to FIG. 1, the liquid treatment system of the present invention includes a flotation basin 10, pressure pump 12 for pumping recycled liquid such as water, ejector 14 for introducing a gas such as air into the liquid and solubilization device 16 for dissolving the gas in the liquid. Gaseous bubbles are formed as the pressurized dissolved gas and liquid flow passes pressure-reducing valve 18.

Additives 20, if any, pass through valve 22 and are combined with the particulate-carrying liquid 24 at combination conduit 26. The gaseous bubbles and liquid that have passed through valve 18 are combined with the combined waste liquid at combining conduit 28. A valve 30 is provided for taking a sample of the gaseous bubbles and liquid combined with the combined waste liquid. The gaseous bubbles attach themselves to particles. Upon entering flotation basin 10 the gaseous bubbles carrying the particulate are floated to the surface for accumulation where they can be removed. Any heavier particles fall to the bottom of flotation basin 10 as sludge. Clarified liquid is removed from flotation basin 10 through draw-off chamber 108. Effluent flows through conduit 32 to a liquid level box device 34. Liquid level box device 34 is a receptacle and includes an adjustable weir 84 to adjust the liquid level in flotation basin 10. A conduit 36 is provided to discharge the clarified effluent. Recycled clarified liquid flows through conduit 38 to pressure pump 12 for recycling about the system.

An annular release chamber 40 is provided substantially about the periphery of flotation basin 10 for discharging the particulate-carrying liquid and gaseous bubbles into the flotation basin.

Ejector 14 includes a valve 42, a regulator 44 for adjusting the flow of gas, a filter 46 for filtering the gas, a rotometer 48 for measuring the flow of gas, and a check valve 50. Pressure pump 12 includes a gauge 52 for determining the pressure of the liquid. Solubilization device 16 includes a gauge 54 for determining the pressure of the dissolved gas and liquid.

Figure 2:
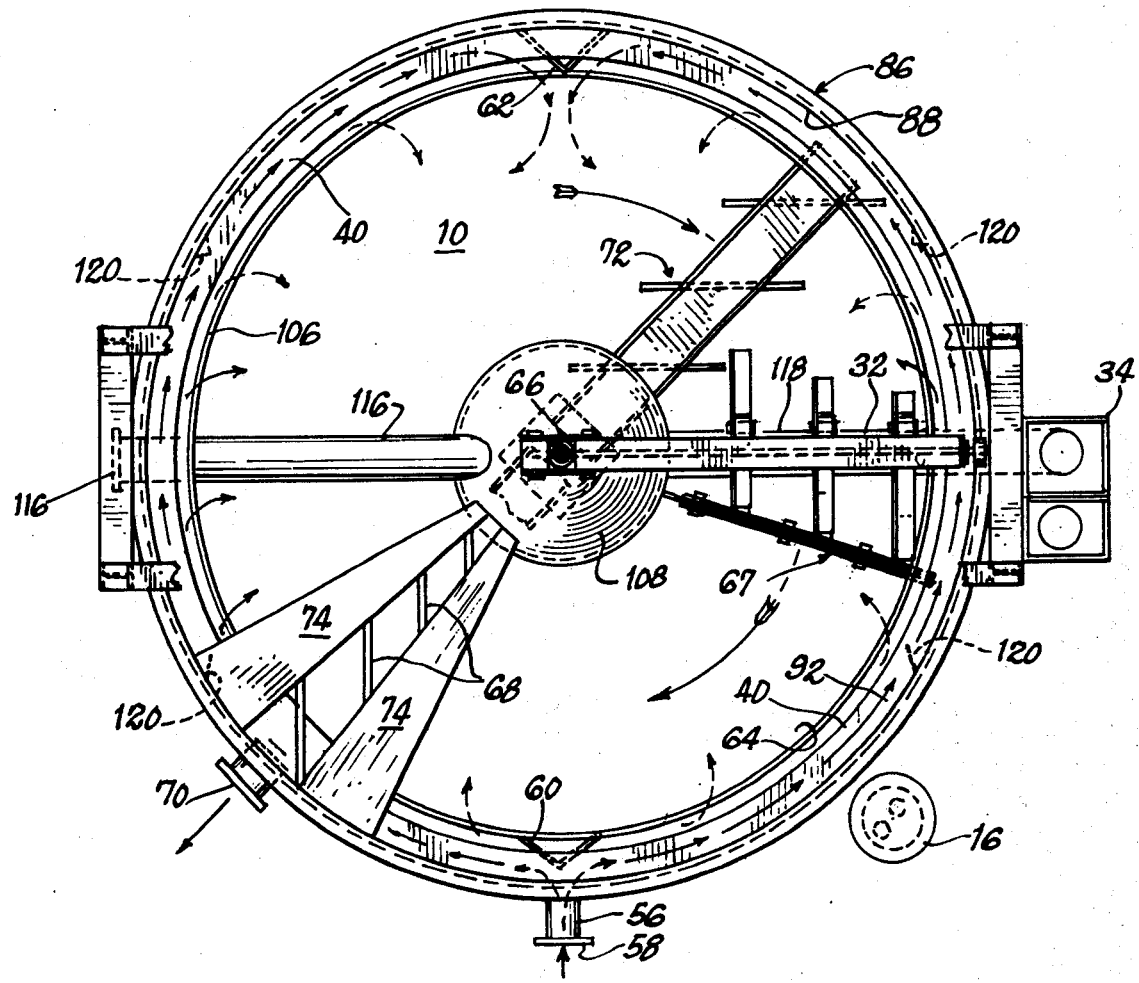
FIG. 2 is a top plan view of the flotation basin used in in the system of the present invention.

Referring to FIG. 2, the influent liquid-carrying gaseous bubbles and particulates enter inlet 56 of the flotation basin 10 at entrance 58. A divider baffle 60 is provided in annular release chamber 40 to split the input flow in opposite directions tangentially about the perimeter of the release chamber. A splitter baffle 62 is provided in the annular release chamber opposite divider baffle 60 to prevent the two tangential flows from converging. Release chamber 40 is located generally about the inner periphery of the flotation basin for reducing the velocity of the liquid discharged into flotation basin 10. The release chamber is submerged in the liquid collected in flotation basin 10.

Annular space 64 (See FIG. 3), which is a slotted opening or aperture substantially about the perimeter of the release chamber 14, is provided to discharge the influent liquid-carrying gaseous bubbles and particulates into the flotation basin. The size of both the slotted annular opening 64 and cross-section of release chamber continuously decrease from divider baffle 60 to splitter baffle 62 in accordance to hydraulic principles in order to uniformly distribute influent about periphery. Because of its inherent design, the annular release chamber 40 optimizes the separation force of the liquid-carrying bubbles and particulates by minimizing inlet velocity and effectively controlling bubble sizes.

In flotation systems of this type, to gas bubbles are formed as the pressurized flow passes pressure reducing valve 18. Although the bubbles are very small in appearance, there is considerable distribution of bubble sizes. The bubbles expand rapidly in size. Too large a bubble size is deleterious to flotation performance. First, large bubbles generally do not attach to particles, rendering a lower average rise rate. Second, large bubbles upon entering a conventional flotation basin cause turbulence and disruption of bubble-attached particles. Third, bubbles already attached ot particles become dislodged from the particles if expanded too large before reaching the liquid surface thereby lowering the average rise rate.

The conventional approach to minimizing excessively growing gas bubbles is to locate the pressure-reducing valve 18 as close as possible to the place where the inlet flow discharges into flotation basin 10. In conventional circular basins, while the pressure-reducing valve is located near the basin entrance 58, the inlet flow is discharged at the center of the basin. Thus the larger the basin, the greater the distance between the pressure-reducing valve and the inlet-discharge. Thus in conventional circular basins, many bubbles expand to an undesirable degree.

In the circular dissolved gas flotation system of the present invention, the formed gaseous bubbles begin entry into flotation basin 10 almost immediately following the pressure-reducing valve by being discharged through the annular slotted opening 64. Owing to greater buoyant force, larger bubbles leave the peripheral release chamber 40 first. Smaller size bubbles are carried further around release chamber 40 for entry. Bubbles that are too small may not attach themselves to particulates or will provide less buoyancy resulting in lower average rise rate. In the present invention, these bubbles are the last to leave release chamber 40 and therefore have sufficient time to expand and grow into a more efficient size capable of attaching to particulates and therefore increasing the average rise rate. Because of the inherent construction of the release chamber 40, release chamber 40 reduces the velocity of the liquid discharged into flotation basin 10.

It can be seen that in the present invention there need be no inlet center well structure as normally found in conventional circular flotation systems. Conventional circular flotation systems use a center inlet well of cylindrical shape that extends above the liquid surface in large size basins. The present invention uses a center drawoff structure 108 of conical shape that tapers to the basin middle. Thus additional basin surface is available for floatable accumulation. The greater basin center volume provides greater detention time for separation and subsequent thickening.

A skimmer 67 is provided to skim the floatable scum up an apron ramp 74 and into a scum trough 82 where it is discharged via a scum outlet 70. Skimmer 67 rolls on a rim 88 and is supported by rails 68 provided over a scum trough 82. A sludge scraper 72 is provided to scrape the sludge off the bottom of flotation basin 10 into a sludge well 77. Sludge scraper 72 and skimmer 67 are commonly rotated by a motorized drive unit 76. The sludge is discharged through an outlet 78 of sludge well 77 via conduit 80.

Flotation basin 10 includes a vertical cylindrical wall 86, integral with a base 90 of flotation basin 10. Annular release chamber 40 has a top 92 which is substantially horizontal. Top 92 has an end 94 attached to wall 86 of flotation basin 10 and an unattached end 104 projecting into basin.

An L-shaped member 96 has a side 98 and a base 100. Base 100 which is substantially horizontal has end 102 attached to wall 86 of the flotation 10. Side 98 is substantially vertical. Side 98 has upward unattached end 106 which is below top 92 when assembled to define a vertical clearance. The base 100 of the L-shaped member is wider than top 92 to define a horizontal clearance when assembled, and is substantially parallel to base 90 of the flotation basin. L-shaped member 96 with top 92 forms with wall 86 a conduit for transporting the liquid. The height of top 92 from base 100 is continuously lowered between the divider baffle 60 and the splitter baffle 62 to provide a progressively decreasing cross-sectional area of release chamber 40.

Figure 3:
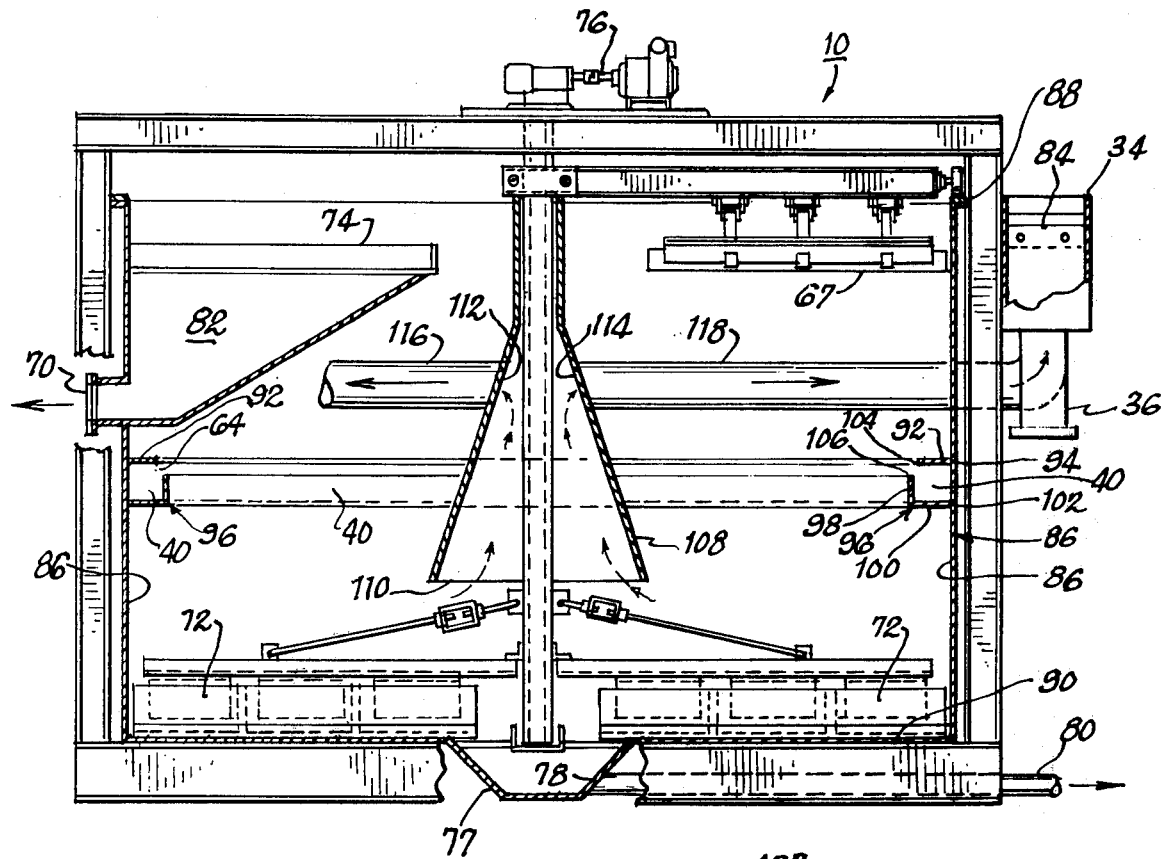
FIG. 3 is a fragmentary vertical section view thereof.

The annular space 64 is a continuous slotted opening or aperture defined by the opening between the unattached end 104 of top 92 and the upward end 106 of side 98, and is angled toward the middle-surface zone of flotation basin 10 as best shown in FIG. 3. Also, the height of end 106 from base 100 is continuously lowered between the divider baffle 60 and the splitter baffle 62 to provide a progressively decreasing slotted opening 64 from the release chamber but at the same bias.

A conical chamber 108 is provided to draw off the clarified liquid in flotation basin 10. The conical chamber 108 is generally coaxial with cylindrical wall 86 of flotation basin 10. The conical chamber 108 has an open base 110 submerged in the liquid contents of flotation basin 10 and has a recycle outlet 112 and an effluent outlet 114.

Conical chamber 108 is shaped so as to uniformly draw off clarified being removed from flotation basin 10. A recycle conduit 116 is attached to recycle outlet 112 to transport the recycled liquid 38 to pressure pump 12. An effluent conduit 118 is connected to effluent outlet 114 to transport the effluent liquid 32 to level control box 34 for discharge from the system 36.

Figure 5:
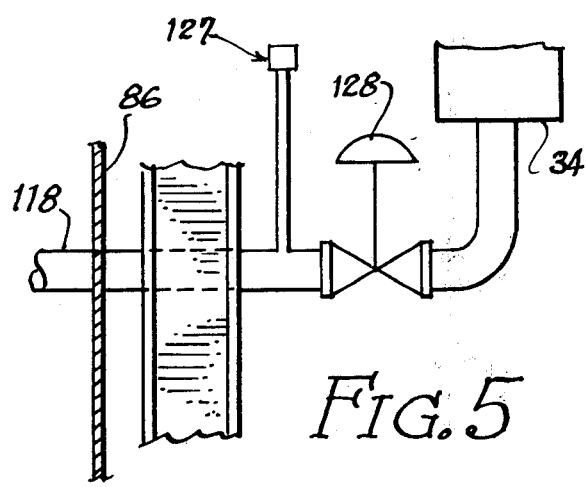
FIG. 5 is a fragmentary schematic diagram of a modified embodiment of a dissolved gas flotation system utilizing a flotation level sensing device which automatically maintains the liquid level in the flotation basin notwithstanding fluctuations in inlet flow.

Referring to FIG. 5, a modified embodiment of the flotation basin 10 includes a liquid level sensor 127 operatively coupled to a mechanical adjustable valve 128 which is hydraulically connected to conduit 118 between wall 86 and box 34. Level sensor 127 senses any changes in liquid level of flotation basin 10 caused by fluctuation of input flow causing valve 128 to correspondingly vary the discharge effluent flow proportionally to the input flow and effectuate return of the liquid level in flotation basin 10 to its original level.

In the present invention, in order to achieve uniform peripheral flow distribution, the lengths of top 92, side 98 and base 106 are designed in proportional relationship to a fixed input flow rate. For some applications the exact input flow rate is not known or is variable. To compensate for this, case vanes 120 are positioned in the release chamber to induce a variable contraction of the cross-section flow within release chamber 40 as a function of the flow rate. The effect is likened in hydraulic principles to the venacontracta effect of flow over a weir crest or through a venturi chamber. Vanes 120 are symmetrically located about release chamber 40 in a number that is a function of basin diameter. The height of each vane 120 is the same as end 106 where located. The inward projection distance of each vane is no more than one-half of base 100 where located.

Figure 4:
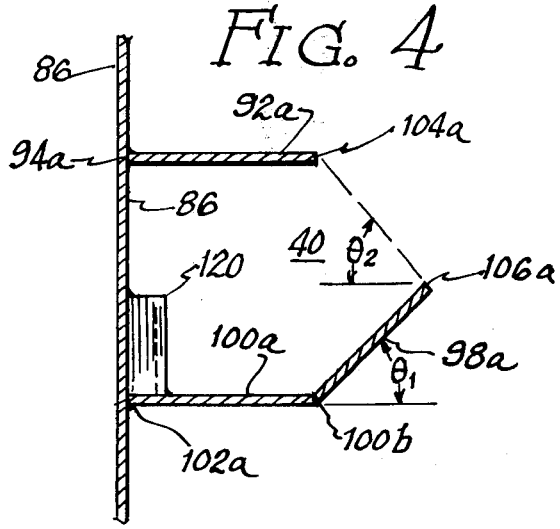
FIG. 4 is a fragmentary vertical sectional view of a modified embodiment of the release chamber.

For application of increasing larger diameter basins of the present invention, it is desirable to maintain the flow direction from slotted opening 64 of release chamber 40 toward the middle-surface sector of flotation basin 10. Referring to FIG. 4, a modified embodiment of the annular release chamber 40 includes top 92a which is substantially horizontal. Top 92a has an outward end 94a attached to the wall 86 of the flotation basin. The modified embodiment of the annular release chamber 40 also has base member 100a which is substantially horizontal. The base member 100a has an outward end 102a attached to the wall 86 of the flotation basin 10.

A lip member 98a is attached to the inward end 100b of the release chamber base member 100a. Lip member 98a is positioned at angle of $\theta_1$ degrees to the release chamber base member 100a. Top 92a, with release chamber base member 100a and lip member 98a, forms with the flotation basin wall 86 a conduit for transporting the liquid-carrying gaseous bubbles and particulates. The height of top 92a from base 100a is continuously decreased between the divider baffle 60 and the splitter baffle 62 to provide a progressively decreasing cross-sectional area of release chamber 40. The angle $\theta_1$ is decreased from 90° to 30° with successively larger diameter flotation basins. By way of example only, a 15 foot diameter cylindrical flotation basin 10 made in accordance with the principles of this invention would have a $\theta_1$ angle of 90°. Similarly, a 50 foot diameter flotation basin 10 would have a $\theta_1$ angle of 45°, and a 100 foot diameter flotation basin 10 would have a $\theta_1$ angle of 30°.

Chamber outlet 64 is a continuous slotted opening of aperture defined by the opening between the unattached or inward end of top 104a and the unattached or inward end of lip member 106a at an angle $\theta_2$ degrees for inlet flow directed toward the middle-surface zone of flotation basin 10. The height of end 106a from base 100a is continuously decreased between the divider baffle 60 and the splitter baffle 62 to form a progressively decreasing slotted opening 64 in release chamber 40. Angle $\theta_2$ compliments angle $\theta_1$ so that the sum of $\theta_1 + \theta_2$ equals 90°. Angle $\theta_2$ decreases from 90° to 30° with successively larger flotation basins. Therefore, for the examples of angle $\theta_1$ previously given, when angle $\theta_1$ is 30°, angle $\theta_2$ is 60°; similarly, when angle $\theta_1$ is 45°, angle $\theta_2$ equals 45°; and when angle $\theta_1$ is 90°, angle $\theta_2$ is zero.

Typical commerical and industrial applications include, but are not limited to:

1. Recovery of product wash/rinse water.
2. Clarification of industrial waste water.
3. Clarification of storm run-off water.
4. Clarification of municipal waste under discharge.
5. Concentrating product slurries.
6. Concentrating municipal water/waste water sludges.

Figure 6:
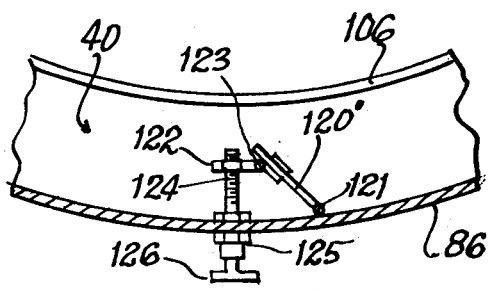
FIG. 6 is a fragmentary horizontal sectional view of a modified embodiment of a dissolved gas flotation system having adjustable vanes which are selectively movable to vary the flow rate.

Referring to FIG. 6, a modified embodiment of the annular release chamber 40 is provided for damping variable input flow rates entering basin entrance 58. The modified embodiment inclubes an adjustable vane 120' attached to wall 86 by a first movable hinge 121. A second movable hinge 123 pivotally attaches vane 120' to a threaded bar 122. A threaded valve stem 124 cooperatively engages threaded bar 122 and is held in wall 86 by water-tight bonnet 125. Extending outward from valve stem 124 is rotatable control handle 126, which when rotated clockwise effectuates movement of bar 122 radially inward toward the center of basin 10 to correspondingly cause vane 120' to move toward wall 86 thereby decreasing the flow restriction in annular release chamber 40 to accommodate an increased inlet flow rate. Counterclockwise rotation of control handle 126 causes vane 120' to move outward from wall 86 resulting in increased flow restriction in annular release chamber 40 to accommodate lower inlet flow rates.

Although an embodiment of the invention has been shown and described, it is to be understood that various modifications and substitutions may be made by those skilled in the art without departing from the novel spirit and scope of the invention.

For example, the flotation basin 10 could be polygonal, including rectangular, although a circularly-shaped basin is preferred. Flotation basin 10 could also be designed with a stationary center column having recycle and effluent conduits 116 and 118 extending vertically beneath basin 10 before extending radially outward beyond peripheral wall 86. Furthermore, the shape of chamber 108 could be that of a small cylinder telescopically extending downward into a large cylinder, the small cylinder being located in the upper middle portion of flotation basin 10, the large cylinder having an inlet positioned similar to open base 110. Alternatively, chamber 108 could be formed of a series of radial troughs operatively connected to recycle conduit 116 and effluent conduit 118.

I claim:

1. In a dissolved gas flotation system including means to inject gas into liquid and to dissolve the gas into the liquid, and having a flotation basin which receives a liquid having gaseous bubbles and particulates, wherein the improvement comprises: a submerged release chamber having a fixed fluid volume located generally about a major portion of the inner periphery of the flotation basin for reducing the velocity of the liquid discharged into the flotation basin, said release chamber including inlet means to receive the liquid and outlet means to discharge the liquid into the flotation basin to permit upward flotation of the gaseous bubbles and particulates.

2. A dissolved gas flotation system as in claim 1 wherein said outlet means defines a slotted opening substantially about the length of the release chamber to increase the rise rate of the bubbles by minimizing the amount of the bubbles that become turbulent and do not adhere to particles.

3. A dissolved gas flotation system as in claim 2 wherein said inlet means includes a divider baffle to split the input flow in opposite directions tangentially about the length of the release chamber; said outlet means including a splitter baffle to prevent the two tangential flows from converging and to prevent the flotation basin contents from circumvolving; and wherein the size of both the slotted opening and the cross-sectional area of the release chamber are reduced from the divider baffle to the splitter baffle to uniformly distribute the flow about the periphery of the flotation basin.

4. A dissolved gas flotation system as in claim 1 wherein vanes are fixedly disposed in the release chamber.

5. A dissolved gas flotation system as in claim 1 including selectively movable vanes positioned in the release chamber to vary the peripheral flow distribution in the release chamber in proportional relationship to inlet flow through said inlet means.

6. A dissolved gas flotation system as in claim 5 wherein the effluent conduit means include means to adjust the liquid level in the flotation basin; said level adjusting means comprising a receptable and an adjustable weir operatively associated with the receptacle.

7. A dissolved gas flotation system as in claim 1 having a conical chamber that is generally coaxial and operatively associated with the flotation basin to draw off the clarified liquid in the flotation basin, said conical chamber having an open submerged base; recycle conduit means operatively associated with the conical chamber for transporting the clarified liquid to be recycled in the dissolved gas flotation system; and effluent conduit means operatively associated with the conical chamber for transporting the clarified liquid that is to be discharged from the system.

8. A dissolved gas flotation system as in claim 7 including means for maintaining the liquid level in the flotation basin at a substantially constant level during operation notwithstanding a variable inlet flow rate.

9. A dissolved gas flotation system as in claim 1 having trough means operatively associated with the flotation basin to collect flotation scum, said trough means defining an outlet for discharge of scum; rotatable means operatively associated with the flotation basin to skim the floatable scum into the trough means; said flotation basin including well means on the bottom of the basin to collect the sludge, said well means defining an outlet for discharge of sludge; conduit means operatively associated with the outlet of the well means for transporting the discharged sludge out of the flotation basin; and rotatable means operatively associated with the flotation basin to scrape the sludge off the bottom of the basin into the well means.

10. A dissolved gas flotation system as in claim 1, said flotation basin including a generally cylindrical wall and a base operatively associated with the wall; said release chamber being generally annular in shape and including a top and a generally L-shaped member having a side and a base, said side having an upward end which is beneath said top, said base of the L-shaped member being wider than the top so that the upward end and the top form an opening defining the outlet means, and said L-shaped member and said top forming a portion of a conduit for transporting the liquid.

11. A dissolved gas flotation system as in claim 1 wherein the flotation basin includes a cylindrical wall and a base operatively associated with the wall; said release chamber being generally annular in shape and including a top and a base member, a lip member obtusely attached to the inward end of said base member and forming an angle therewith that increases with successively large flotation basins, said lip member forming with said top a portion of a conduit for transporting the liquid-carrying gaseous bubbles and particulates.

12. A dissolved gas flotation system as in claim 11 wherein the top, lip and the release chamber base members are substantially equal in width; said inlet means including a divider baffle to split the input flow in opposite directions tangentially about the length of the release chamber; said outlet means including a splitter baffle to prevent the two tangential flows from converging and to prevent basin contents from circumvolving; the vertical distance between the top and the release chamber base member being progressively reduced from the divider baffle to the splitter baffle to uniformly distribute the flow about the periphery of the flotation basin; the vertical distance between the top and the unattached end of the lip member being progressively reduced from the divider baffle to the splitter baffle to uniformly discharge the flow about the periphery of the release chamber.

13. A dissolved gas flotation system as in claim 1 wherein said flotation basin has a polygonal periphery.

14. A dissolved gas flotation system as in claim 1 wherein said flotation basin is rectangular.

15. A dissolved gas flotation system as in claim 14 wherein said release chamber is circular.

16. A dissolved gas flotation system as in claim 1 including a center column operatively associated with the flotation basin having a recycle conduit and an effluent conduit.

17. A dissolved gas flotation system comprising in combination: a flotation basin having a generally vertical cylindrical wall and a base operatively associated with said wall; pressure pump means operatively associated with the flotation basin for pumping recycled liquid; ejector means operatively associated with the pressure pump means for introducing gas into the liquid; solubilization means operatively associated with the ejector means for dissolving the gas in the liquid; a pressure-reducing valve operatively associated with the solubilization means for forming gas bubbles; combining means operatively associated with the pressure-reducing valve for combining liquid-carrying particulates with the gas bubbles; means directing the combined liquid-carrying particulates and gas bubbles into the flotation basin to permit liquid-carrying gas bubbles to float to the top surface of the liquid in the flotation basin, said directing means including an annular release chamber about a major portion of the cylindrical wall, said annular release chamber having a fixed fluid volume with inner wall means defining an opening substantially about the inner wall means for centripetal discharge into the flotation basin of the liquid containing particulate-carrying bubbles; means operatively associated with the flotation basin to adjust the liquid level in the flotation basin; and means operatively associated with the flotation basin for removing clarified liquid for recycling to the pressure pump means.

18. A dissolved gas flotation system as in claim 17 wherein the ejector means includes means to regulate the flow of air, a rotometer for measuring the flow of air, and means for filtering the air; said pressure pump means includes a gauge for determining the pressure of the water; said solubilization means includes a gauge for determining the pressure of the dissolved air and liquid; and said clarified water-removing means includes a conical chamber that is generally coaxial with the flotation basin, said conical chamber having an open base submerged in the water collected in the flotation basin, and recycle conduit means operatively associated with the conical chamber for transporting clarified water to said pressure pump means.

19. A dissolved gas flotation process comprising the steps of: introducing gas into recycled liquid; dissolving the gas in the liquid; forming gas bubbles in the liquid; combining water-carrying waste with the gas bubbles and recycled liquid; transporting the combined liquid-carrying particulates and gas bubbles into the entrance of an inlet to the flotation basin; reducing the entrance inlet velocity of the combined liquid-carrying particulates and gas bubbles; feeding the velocity-reduced liquid-carrying particulates and gas bubbles into a flotation basin via a submerged release chamber having a fixed fluid volume located generally about a major portion of the inner periphery of the flotation basin; providing upward flotation of the particulate-carrying gas bubbles; removing the flotable particulate from the flotation basin; removing clarified liquid from the flotation basin for effluent discharge; removing clarified liquid from the flotation basin for recycling; and pumping the recycled liquid to the gas introduction means.

* * * * *